United States Patent [19]

Tournois

[11] Patent Number: 5,822,097
[45] Date of Patent: Oct. 13, 1998

[54] LINEAR EXTENSION DEVICE FOR COHERENT OPTICAL WAVE PULSES AND EXTENSION AND COMPRESSION DEVICE USED TO OBTAIN HIGH POWER PULSES

[75] Inventor: Pierre Tournois, Cagnes S/Mer, France

[73] Assignee: Thomson-CSF, Paris, France

[21] Appl. No.: 336,137

[22] Filed: Nov. 7, 1994

[30] Foreign Application Priority Data

Nov. 19, 1993 [FR] France .................................. 93 13878

[51] Int. Cl.[6] .................................................. H04J 14/02
[52] U.S. Cl. .......................... 359/130; 359/566; 356/305
[58] Field of Search ............................ 356/305; 359/130, 359/566; 385/10

[56] References Cited

PUBLICATIONS

Tournois, P. ; Proc. SPIE, Int. Soc. Opt. Eng., May 31, 1995, vol. 2633, pp. 337–347, 1995: Abst. Only Herewith.
Laislaux et al, Opt. Lett., vol. 21, #11, Jun. 1, 1996, Abstract Only Herewith.
Tournois et al, Opt. Commun., vol. 119, No. 5–6, pp. 659–675, Sep. 1995; Abst. Only Herewith.

*Primary Examiner*—Nelson Moskowitz
*Attorney, Agent, or Firm*—Oblon, Spivak, McClelland, Maier & Neustadt, P.C.

[57] ABSTRACT

A device for linearly extending the duration of laser light pulses by subjecting the pulses to double diffraction based on a series of variable step gratings placed at right angles to each other. Increased power density is obtained by placing a compression grating at an angle such that each wavelength of light emerging from the compression grating travels an optical path of approximately the same distance, and focusing the emerging light with a lens. Increased amplification is obtained by placing a segmented laser amplifier, one segment aligned with each wavelength of light separated by the double diffraction of the series of variable step gratings and interposed between the series of variable step gratings and the compression grating.

5 Claims, 3 Drawing Sheets

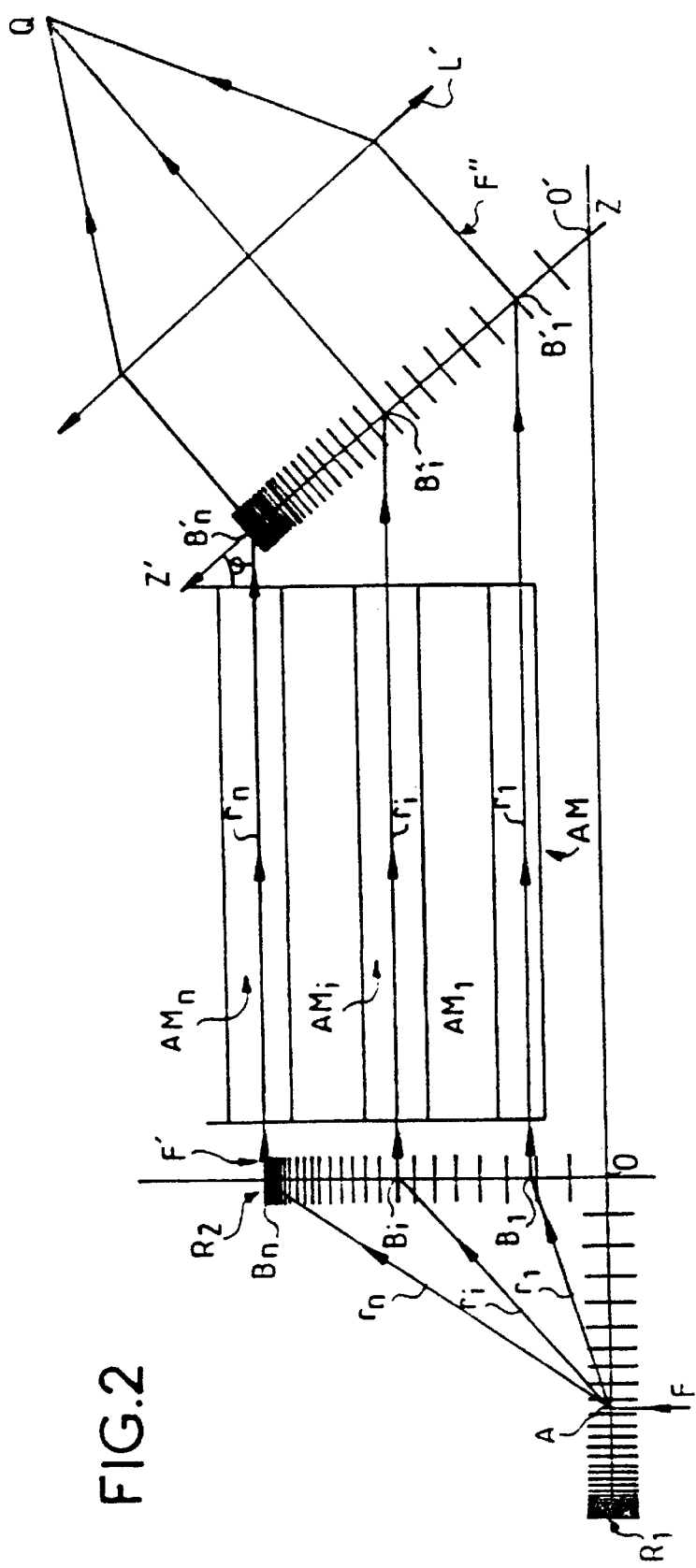
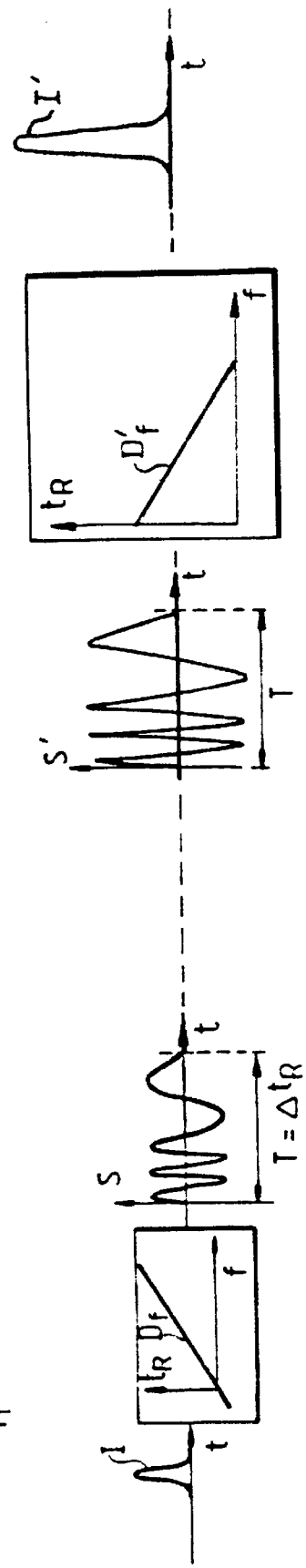
FIG.2
FIG.3

LINEAR EXTENSION DEVICE FOR COHERENT OPTICAL WAVE PULSES AND EXTENSION AND COMPRESSION DEVICE USED TO OBTAIN HIGH POWER PULSES

BACKGROUND OF THE INVENTION

The invention concerns a linear extension device designed for use on coherent optical wave pulses in, for example, the near infrared range, as well as its use to obtain high power densities.

The requirements of a range of different types of applications means that considerable effort is devoted on a permanent basis to the improvement of the power delivered by lasers.

Hence, the possibility of obtaining power densities of the order of $10^{15}$ to $10^{16}$ W/cm$^2$ from lasers delivering a power of the order of 1 gigawatt ($10^9$ W) has contributed to the development of fields such as non-linear optics, thermonuclear fusion, atom ionization, etc. Even higher power densities ($10^{18}$ to $10^{20}$ W/cm$^2$) will enable the exploration of new fields based on laser-matter interaction.

For such applications, lasers have been developed which are capable of delivering a power of the order of 1 terawatt ($10^{12}$ W), therefore providing one or more kilojoules in a nanosecond (or in several picoseconds). Such energy levels are obtained by amplification then focusing of the laser beam. As power densities during the amplification phase are limited to a few gigawatts/cm$^2$, it has been necessary to implement amplifier media of large dimensions (70 cm or more in diameter). Such high-technology installations require high levels of investment.

More recently, compact lasers delivering extremely compact pulses (of the order of 1 picosecond) and high power (of the order of several tens of gigawatts) have appeared (developed by, for example, the Atomic Test Center in Saclay, France or by the University of Michigan in the USA). These lasers are capable of results which are comparable, or even superior, while using considerably more cost-effective resources than earlier installations.

The processing chain of such lasers consists of the following stages: widening of the spectral band (2 or 3 nanometers, for example) and lengthening of the duration of the pulse (typically 1 nanosecond) delivered by a conventional laser (an ytrium-lithium fluoride YLF oscillator, for example) in the near infrared range; amplification in a doped solid medium (conventionally a bar of ytrium-alumina garnet crystal YAG doped with neodymium) to obtain power levels of the order of 1 joule; and finally, compression in a dispersing medium to deliver energy equivalent to a few joules for a pulse duration of the order of 1 picosecond, i.e. a power of several terawatts. The compression ratio, and therefore the power delivered, can be increased by a factor of 10 by using a sapphire laser doped with titanium capable of amplifying wider spectra as an amplifier bar.

Another application concerns ultra-rapid, very high frequency imaging, intended, for example, for the analysis of intermolecular interaction. The problem in this instance is the requirement for laser pulses of extremely short duration. When a pulse is spread over a period T and over a spectral band $\Delta f$ wide, the compression ratio (T$\Delta f$) is very high (between $10^4$ and $10^5$), and can provide an exceptionally short pulse duration of $1/\Delta f$ which can be as low as a few tens of femtoseoconds.

In addition, another possible application concerns the detection of targets by the reception of modulated pulses emitted by laser sources. This type of detection is used, for example, in Lidars ("Light Detection and Ranging") or in active imagery systems. At emission, laser pulses of long duration T are frequency-extended in order to obtain efficient detection of all targets. At reception, the detection system is equipped with a correlator or a pulse compression filter which compresses the useful signal received according to a compression ratio equal to T$\Delta f$. The pulse is then frequency demodulated and the filter delivers all the pulse frequencies. Analysis of these frequencies in an optical detector, conventionally an avalanche detector, delivers a target detection signal.

The compression devices used consist of dispersing optical delay lines, whose propagation time variation, conventionally obtained using diffraction, decreases or increases with frequency. Hence, a negative dispersion line delays the lower frequencies of the band, and the higher frequencies catch these lower frequencies to produce a pulse of compressed duration equal to $1/\Delta f$. In these ideal conditions, the pulse duration T is reduced as far as possible under application of a reduction rate of $T/(1/\Delta f)$, i.e. T$\Delta f$.

Unfortunately, compression performance is limited with the dispersing optical delay lines currently in existence, particularly for frequency bands with high frequency modulation $\Delta f$, or for long pulse durations T.

This has led to the use of prism trains, described, for example, by R. L. Fork, O. E. Martinez and J. P. Gordon in an article in the review Optics Letters, 1984, Vol. 9, pp 150–152 entitled "Negative dispersion using pairs of prisms, or of diffraction gratings, used notably by Edmond B. Treacy, and described, for example, in the IEEE article "Optical Pulse Compression Wave Diffraction Gratings", volume QE-5, September 1969, pp 454 to 458, or by P. Tournois in an article in the review Electronics Letters, 1993, vol. 29, pp 1414–1415 entitled "New diffraction grating pairs with very linear dispersion for laser pulse compression".

The compression ratios attainable are in fact limited by the non-linearity of the frequency dispersion as a function of delay time.

For spectral bands of high $\Delta f$ or for long pulse durations T, the acceptable dispersion linearity range is reduced, at least for one of the two basic parameters, $\Delta f$ or T, which considerably limits the coherent optical pulse compression/extension performance, particularly in the "high power" applications described above.

SUMMARY OF THE INVENTION

The aim of the invention is to implement means to produce extension and/or compression in time of pulses which is strictly linear across the whole of a frequency band of a given width.

The invention is based on the following effect: when a short optical pulse delivered by a coherent light source undergoes double diffraction on a series of two variable step gratings disposed at right angles to one another, the duration of the pulse is increased. When the step at each point in one grating is inversely proportional to the distance from this point to the second grating, the pulse will emerge at right angles to the second grating and is frequency dispersed in time in strictly linear fashion, or, in other words, the variation of delay time according to frequency is strictly linear.

Such a series of gratings consists of a dispersing delay line to lengthen and frequency modulate a short laser pulse in linear fashion.

More precisely, the invention concerns a linear extension device for coherent optical wave pulses in a given frequency band, comprising a first and a second optical gratings, each grating having a step defined at different points, each point of one of said gratings being located from a distance to the other grating, materials transparent to the optical wave pulses having a surface to locate said optical gratings, wherein said gratings surfaces are perpendicular to one another and said grating step is inversely proportional to said distance from this point to said other grating, said grating involving a combined diffraction which linearly frequency disperses in time the pulses incident at right angles to said first grating surface and emergent from said second grating at right angles to it.

The invention also concerns the combined use of such devices in applications as described above. To this end, a compression/extension device of the type described above can be used in a dispersing line to deliver a spatially widened beam which is linearly dispersed in frequency in combination, after amplification, with another device, this time used for compression.

Under an embodiment which is particularly advantageous with respect to the applications described above, the invention also concerns an extension and compression device featuring a delay line consisting of the diffraction grating pair as described above combined, after amplification, with a single compression grating whose step obeys a variation law of the same type as that of the delay line gratings, this single grating being inclined at an angle of inclination calculated in such a way that the optical paths of the different waves be of approximately equal length. Focusing the flux emerging from this inclined grating enables high power densities to be obtained.

A further characteristic is the implementation, between the extension and the compression of the different frequencies making up the pulse, of an amplification stage segmented into frequency sub-bands, exploiting the spatial separation of the rays of the widened beam along which the different waves travel. With the beam subdivided into sub-waves corresponding to the various frequency sub-bands, selection of suitable characteristics for the different amplifier bars used to amplify the different sub-beams enables optimised amplification according to the frequency.

BRIEF DESCRIPTION OF THE DRAWINGS

Other characteristics and advantages will be made clear in the following description, accompanied by the appended figures which represent, respectively:

FIG. 2, an example embodiment of a device according to the invention consisting of a double grating delay line combined with an inclined grating, intended in particular for obtaining a high power flux;

FIG. 3, a series of diagrams illustrating the successive phases of extension and compression carried out in FIG. 2;

PREFERRED EMBODIMENT OF THE INVENTION

Figure 1:
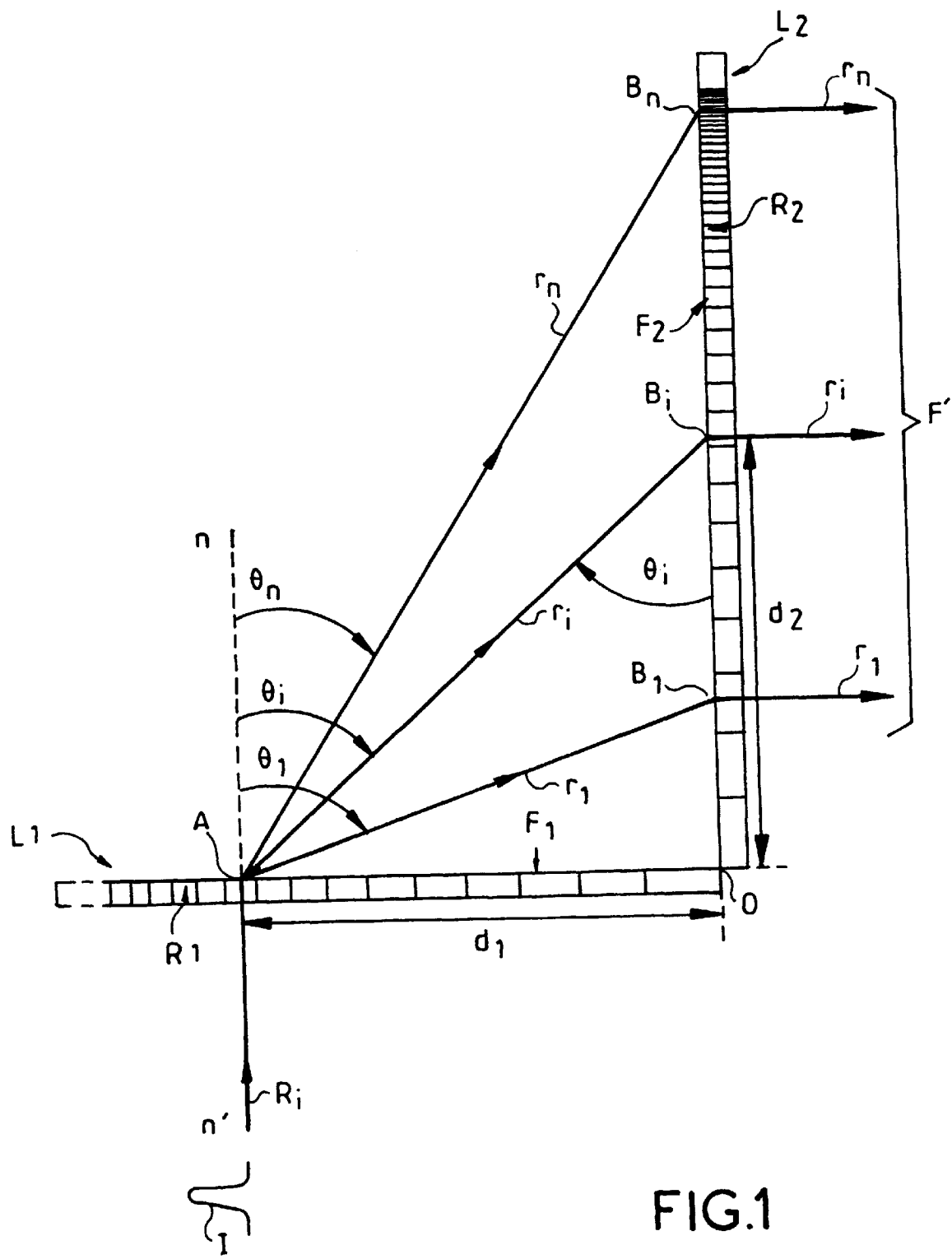
FIG. 1, an example embodiment of a device according to the invention consisting of two perpendicular gratings.

FIG. 1 shows a cross-section view through a non-limiting example embodiment of a device according to the invention, consisting of a pair of perpendicular gratings. In schematic terms, the embodiment consists of two optical gratings R1 and R2 etched on two plane perpendicular surfaces F1 and F2 respectively of two parallel faced blades L1 and L2.

The gratings can be produced using any of the known techniques: line gratings, holographic gratings, blaze-off gratings, etc. A grating is identified by its step a, most commonly expressed in terms of the number of lines per unit of length along its main axis; for example, when a is 1 $\mu$m, the grating has 10 000 lines per cm.

The blades are cut from a glass which is transparent in the spectral band used into two thin parallelepipeds. The two opposing faces F1 and F2 intersect along a straight line represented by O in the plane of the drawing.

An optical pulse I is emitted for a short period by a laser source, a sapphire laser doped with titanium, for example. This pulse produces a parallel and narrow beam of light waves with a flat wave front. This wave front is represented in FIG. 1 by an incident ray $R_i$ which strikes grating R1 at a point A. As the incident beam is perpendicular to grating R1, the angle of incidence, defined with respect to the normal to the grating at the point of contact, is zero.

The incident light beam $R^i$ is diffracted by grating R1 at point A. At this point, which is at a distance of d1 from point O, grating R1 has a step of value $a_1$. FIG. 1 also shows the different optical paths of extreme rays $r_1$ and $r_n$ and of generic ray $r_i$, which are waves of frequency $f_1$, $f_n$ and $f_i$ respectively; rays $r_1$, $r_n$ and $r_i$ are diffracted at point A through decreasing angles $\theta_1$, $\theta_n$ and $\theta_i$ and reach second grating R2 at points $B_1$, $B_n$ and $B_i$ respectively. Under these conditions, waves of higher frequencies have a longer optical path than waves of lower frequencies and are therefore delayed. Thus the various rays $r_i$ are spatially separated in the plane of the second grating and the waves they transport are modulated in time.

Beam $R_i$, composed of waves of generic frequency fi (where i varies from 1 to n, n being an integer greater than 1), is diffracted in the direction of grating R2 through angles $\theta_i$, whose values at the point A under consideration only vary according to frequency fi. The conventional grating theory formula is written as follows:

$$\sin\theta_i = \frac{pc}{a_1 fi}, \quad (\text{I})$$

where p is a suitable integer,
and where c is the speed of the light between the gratings.

Because the gratings are orthogonal, diffraction at $B_i$ is through the complementary angle of $\theta_i$, and the fundamental relation at $B_i$ is as follows:

$$\sin(\pi/2 - \theta_i) = \cos\theta_i = \frac{pc}{a_2 fi}. \quad (\text{II})$$

Combining the two relations (I) and (II) using the notation used above gives:

$$tg\theta_i = \frac{a_2}{a_1} = \frac{d_1}{d_2}. \quad (\text{III})$$

According to the invention, the values of steps $a_1$ and $a_2$ of gratings R1 and R2 at points which are distances $d_1$ and $d_2$ respectively from gratings R2 and R1 are such that the products $a_1 d_1$ and $a_2 d_2$ are equal and of constant value:

$$a_1 d_1 = a_2 d_2 = Kc^2 \quad (\text{IV})$$

(where K is a suitable constant)
so that relation (III) above is satisfied whatever the position of incident points A and $B_i$ on the gratings.

Under these conditions, all rays $r_1$ to $r_n$ of the widened beam B1Bn are diffracted perpendicular to the surface of second grating R2, therefore forming a parallel beam F' whatever the value of the angle of diffraction $\theta_i$.

In other words, when gratings R1 and R2 have a step at each point which is inversely proportional to the distance from this point to the other grating, which satisfies relation (IV) above, all the rays are diffracted perpendicular to the second grating, and parallel outgoing beam F' delivers a signal which is frequency dispersed in strictly linear fashion, whether incident beam F is wide or narrow. Under these conditions, the optical path between A and $B_i$ followed during a period t is written as follows, with due consideration for conventional geometric relations:

$$ct_r = \frac{d_1}{\sin\theta_1}.$$

If this relation is combined with fundamental relation (I) a law for the strictly linear variation of delay time $t_r$ as a function of $f_i$ can be deduced as follows:

$$t_r = \frac{a_1 d_1}{pc^2} f_i. \quad (V)$$

Thus, for the total duration T between the extreme frequencies ($f_n - f_1 = \Delta f$), using the notation of relation (IV):

$$T = \frac{K}{p} \Delta f.$$

Thus, for a given optical pulse in a spectral band of frequencies $\Delta f$, the deviation of the delay time T equal to $\Delta t_r$ (delay time variation between the extreme frequencies of the spectral band) and the extension rate $T\Delta f$ are given by the following relations:

$$T = (K/p)\Delta f.$$

$$T\Delta f = (K/p)\Delta f^2.$$

Orthogonal gratings R1 and R2 represent an angular dispersion delay line acting on an incident pulse in the direction of propagation used.

The emergent beam is composed of waves which are frequency dispersed in space and in time. By inverse light return, such a device acts as a compression filter for a parallel beam which is frequency modulated in space and in time.

Variable-step grating devices consisting of a pair of orthogonal gratings as described above can be used to obtain high power levels.

A example embodiment particularly well suited to such an application is described below, with reference to the pulse extension and compression device shown in FIG. 2. This figure illustrates a combination of an orthogonal grating pair delay line of the type described above and a compression line consisting of a single variable-step grating.

Under the same notation as that used above, a laser pulse I forming a narrow beam F strikes the surface of first grating R1 of delay line R1R2 described above at right angles. After double diffraction, a beam F' emerges at right angles from grating R2. As described above, this beam is made up of parallel rays $r_i$ carrying linearly delayed waves of frequencies $f_i$ (where i varies from 1 to n). Rays $r_i$ emerge from grating R2 at points $B_i$ respectively, dispersed approximately linearly in space according to their frequency; they deliver a signal S which is frequency modulated in strictly linear fashion as the values of delay time $t_r$ vary linearly according to the frequency $f_i$, and follow a positive slope (as shown by relation (V)).

FIG. 3 shows characteristic time graphs opposite each of the processing phases carried out in FIG. 2 (extension-amplification-compression). Hence, the straight line $D_f$ of the variation of $t_r$ as a function of $f_i$ appears with a positive slope for the space separating R1 and R2 in FIG. 2.

The appearance of modulated signal S as a function of time is also shown in FIG. 3 opposite the output from grating R2 shown in FIG. 2, with the lower frequencies in front of the higher frequencies.

For the purposes of compressing such a linearly frequency modulated signal completely, in order, for example, to obtain very high power levels after amplification with an amplifier AM, it is particularly effective to use at the output of grating R2 a grating R of the type described above which is non-uniform so as to obtain a refined linear variation compression law and appropriately inclined to compensate for the different frequency delay times.

Linear compression is therefore obtained in a direction perpendicular to the surface of the grating, and with minimal loss of energy.

In FIG. 2, linearly frequency modulated parallel rays $f_1$, $f_i$ and $f_n$ emerge from amplifier AM and strike points $B'_1$, $B'_i$ and $B'_n$ respectively of non-uniform grating R, which is inclined at an angle $\phi$ with respect to the surface of grating R2. The angle of inclination $\phi$ of this grating is adjusted so that the frequencies delayed in delay line R1R2 each "make up" their respective delay.

For a pulse I striking grating R1 at a distance $d_1$ from second grating R2, for a frequency band of width $\Delta f$ and for a given time deviation T, equal to the difference between the delay times $t_r(f_n) - t_r(f_1)$ applied to the extreme frequencies ($f_1$ and $f_n$) in delay line R1R2, an elementary calculation according to the delay T between the extreme frequencies shows that compression grating R is inclined at an angle $\phi$ such that:

$$tg\phi = \frac{cT}{B_1 B_n},$$

in order that, in overall terms, the optical paths of the extreme rays at points of incidence $B_1$ and $B_n$ be equal and that the paths of the various rays $r_i$ at points $B_i$ be approximately equal.

The value of the width $B_1 B_n$ of parallel beam F' emerging from delay line R1R2 can be found easily by calculation on the basis of the values of T, $f_1$ and $f_n$. Moreover, if the position of point of incidence B1 in terms of its distance from point O is known, it is simple to correctly position the end B'1 of grating R which corresponds to B1; in addition, knowing the value of the angle of inclination $\phi$ of grating R enables the identification of the position of point $B'_n$ corresponding to point $B_n$ and, at the same time, calculation of the useful length of grating R.

In addition, the step $a_i$ of inclined grating R at any point of incidence $B'_i$ of ray $r_i$ of frequency $f_i$ is adjusted in such a way as to obtain a refined compression law between frequencies $f_i$ and the corresponding delay times $t_r$; to achieve this, the variation of step $a_i$ is of the same type as those of gratings R1 and R2, i.e. inversely proportional to a distance d from a reference point O' on the axis of grating R. If the point on the same level as point O is taken as point O', i.e. the point situated at the intersection of the plane of the surface of grating R1 and axis Z'Z at grating R, the step $a_i$ satisfies the following relation (using the same notation as above):

$$a_1 d_1 = a_2 d_2 = a_i d co^2\phi = Kc^2.$$

Under these conditions, the linearly variable compression produced by grating R is represented, as shown by the straight line D'f in FIG. 3, by a refined graphic representation with a negative slope of delay time $t_r$ as a function of f (more precisely equal to $-T tg^2\phi/\Delta f$).

This compression transforms a long pulse of deviation time T with a spatially "coloured" wide beam F' into a short pulse of duration $1/\Delta f$.

The beam F" diffracted by grating R along a direction perpendicular to this grating contains approximately all the rays of frequencies $f_1$ to $f_n$ present in the incident beam: the pulse is therefore compressed in a direction perpendicular to grating R. The outgoing beam F" can be focused by a lens L' in order to obtain a highly concentrated light energy level approximately at point Q.

The amplification of the long pulse is qualitatively illustrated in FIG. 3 with respect to beam F' before and after amplification by a signal S' after amplification and an output pulse I' of greatly superior amplitudes to those of S and I.

By way of concrete illustration of the above paragraphs, an example embodiment of a combination of the type already described calibrated for a laser pulse delivered by a sapphire laser doped with titanium is described below.

The numerical data are as follows: a wavelength of 0.8 $\mu m \pm 0.1$ $\mu m$, i.e. a central frequency of $3.75 10^{14}$ and a spectral band $\Delta f$ approximately equal to $10^{14}$ Hz; a long pulse time T of 100 picoseconds, i.e. a compression ratio $T\Delta f$ of $10^4$, and therefore a short pulse duration ($1/\Delta f$) of 10 femtoseconds; a pulse centered on a point of entry into grating R1 A situated at a distance $d_1$ equal to 8 cm (giving an angle of diffraction of approximately 45° for the central frequency); a value of p of 1.

Under these conditions, the delay line consists of a first grating R1 of step $a_1$ (such that $a_1 d_1 = Kc^2$) equal to 1.13 $\mu m$ at point A, using the following value for K: $K = T/\Delta f = 10^{-24}$ $s^2$.

The second grating R2 has the following attributes:
  a step $a_2$ (such that $a_2 d_2 = Kc^2$), where $d_2 = d_1/tg\phi$, equal to 0.9 $\mu m$ at the point of incidence of the upper frequency $B_n$ and 1.6 $\mu m$ at point $B_1$;
  a length D between points of incidence $B_n$ and $B_1$ (corresponding to the spectral band $\Delta f$) equal to $d_1$ ($1/tg\phi_n - 1/tg\phi_1$), i.e. approximately 4.35 cm, point $B_1$ being at a distance $d_2$ (such that $d_2 = d_1/tg\phi_1$) of approximately 5.6 cm from reference point O.

Complementary calculations show that the central frequency carrier ray fo emerges from second grating R2 in a position at the center of beam F' to within approximately 2%: the spatial frequency distribution of beam F' is very close to linear.

As regards compression grating R, its angle of inclination $\phi$ (such that $tg\phi = cT/D$) is approximately equal to 34.6 degrees, its length L (such that $L = D cos\phi$) is 3.6 cm and its variable step $a_i$ (approximately equal to $pc/f sin \phi$) is 1.24 $\mu m$ for the upper frequency and 1.62 $\mu m$ for the lower frequency.

It should be noted that the space separating the surface of exit grating R2 and the entry surface of inclined grating R is dimensioned to allow for the insertion of a laser amplifier. In particular, it is possible to take advantage of the spatial separation of the different rays $r_i$ corresponding to the different frequencies $f_i$ in order to segment such an amplification process into frequency sub-bands. To this end, the implementation of a series of several YAG lasers with frequency-selective mirrors, $AM_i$ (where i varies from 1 to n), disposed according to the frequency distribution in space as described above, gives particularly high performance. Such selective mirrors are familiar to a specialist in the field, and are produced in particular by the deposit under vacuum of layers of dielectric materials of appropriate number and coefficient of reflection.

Figure 4:
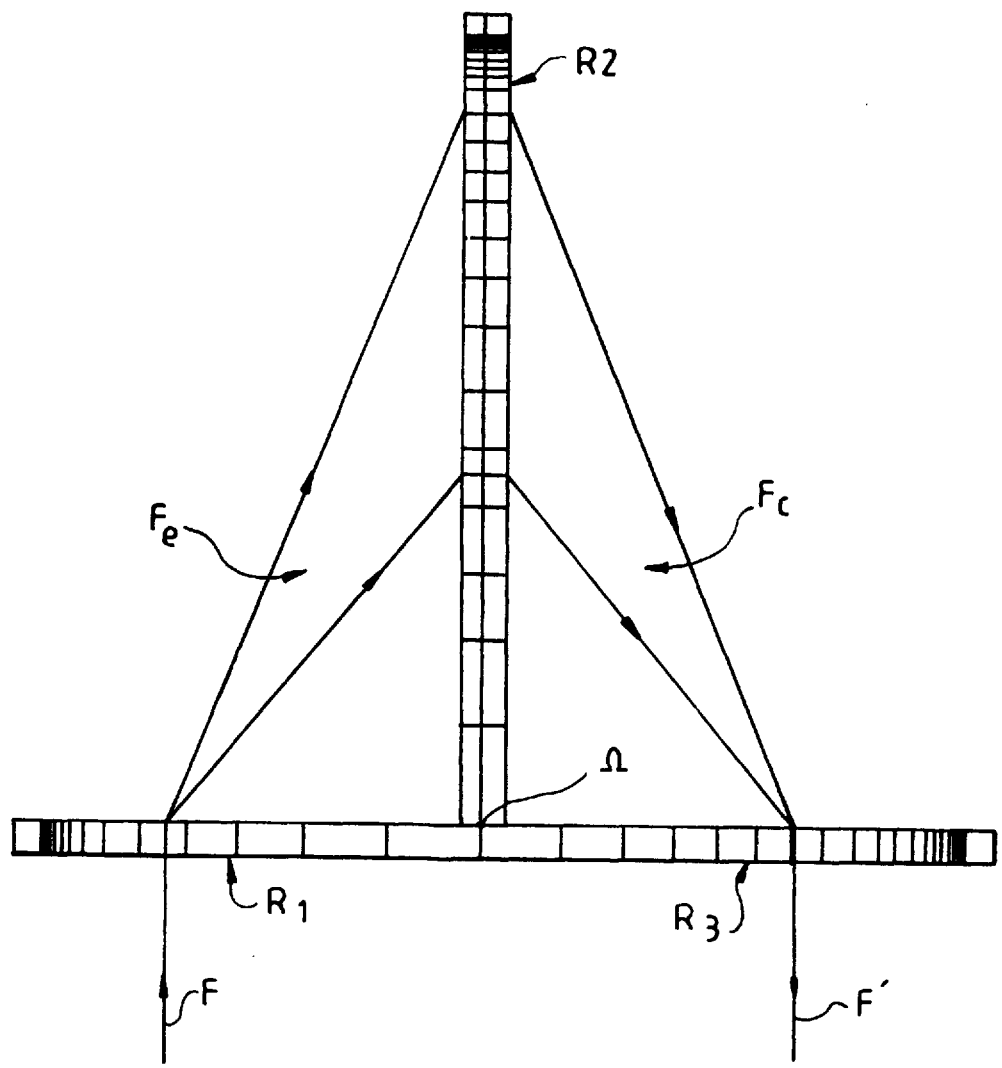
FIG. 4, a "foldup" orthogonal grating pair.

The invention is not limited to the example embodiments described and presented above. In particular, to create an optical extension line the gratings can to good effect be arranged to give the most compact possible dimensions. Such an arrangement, as illustrated in the diagram in FIG. 4, can be created using three gratings R1, R2 and R3.

Entry beam F is widened into beam $F_e$, then concentrated into beam $F_c$. The emergent beam F' is therefore "folded over" parallel to incoming beam F before amplification. This arrangement enables reduction by a factor of 2 of the step $a_2$ of grating R2, so that steps $a_1$, $a_2$, $a_3$ of gratings R1, R2 and R3, which are respectively at distances $d_1$, $d_2$, $d_3$ from the grating intersection point $\Omega$, satisfy the relation:

$$a_1 d_1 = 2 a_2 d_2 = a_3 d_3 = Kc^2.$$

Under these conditions, if all other parameters are identical (particularly excursion time T and the frequency dispersion of the incident beam), grating R2 has a useful length half its previous value, which enables the dimensions of the assembly to be approximately halved. Such a compact arrangement is advantageous, particularly if even higher compression ratios are being sought.

In addition, it should be noted that the diffraction carried out using the devices described and represented above can be produced at transmission as well as under reflection.

What is claimed is:

1. A linear extension device for coherent optical wave pulses in a given frequency band $\Delta f$ comprising a first and a second optical grating, each grating having steps ($a_i$) defined at different points of each grating, each point of each optical grating being located a distance ($d_i$) from the other grating, materials transparent to said optical wave pulses having a surface to locate said optical gratings, wherein said gratings are perpendicular to one another and each respective step is inversely proportional to the distance from the point where the respective step is defined to said other grating satisfying a relationship such that:

$$a_1 d_1 = a_2 d_2 = Kc^2$$

where K is a constant
and where c is the speed of light between the gratings, said gratings involving a combined diffraction which linearly frequency disperses in time, a pulse incident at right angles to said first optical grating and emergent from said second grating at right angles to it as a beam, and wherein said emergent beam has frequencies which are delayed with a delay time which varies linearly with each respective frequency to produce a long pulse duration T which satisfies a relationship such that:

$$t_r = K/p\, f_i$$

where p is an integer.

2. A device as in claim 1, further comprising:
  a third compression grating disposed at an output of said second grating to compress in time waves of said emergent beam of diameter D, said third grating being inclined at an angle $\phi$ with respect to said surface of said second grating such that:

$$tg\phi = \frac{cT}{D}$$

and having a step $a_i$ at every point of incidence of said emergent beam satisfying a relationship such that:

$$a_i d cos^2\phi = Kc^2,$$

where d is the distance between a respective point of incidence of said emergent beam and a point of reference.

3. A device as in claim 1, further comprising:

a third optical grating disposed as a continuation of said first optical grating on the same surface, such that said third optical grating and said second optical grating form a perpendicular grating pair delay line similar to said first and second optical gratings of the extension device, said steps of said gratings satisfying a relation such that:

$$a_1 d_1 = 2a_2 d_2 = a_3 d_3 = Kc^2$$

wherein $a_1$, $a_2$ and $a_3$ are steps respectively defined on said first, second, and third optical gratings at points which are respectively a distance of $d_1$, $d_2$ and $d_3$ from a point located at an intersection of these gratings.

4. A device as claimed in claim 2, further comprising:

a laser amplifier disposed in a space between the surface of said second grating and that of said third grating; and a lens for focusing a beam emerging at right angles to said third grating.

5. A device as claimed in claim 4, wherein said laser amplifier is segmented into a series of amplifiers with frequency-selective mirrors disposed according to a spatial dispersion pattern corresponding to that of frequencies $f_i$ of said beam emerging from said second grating.

* * * * *